Aug. 16, 1927.
J. E. JOHNSON
LATHE
Filed Dec. 18, 1922
1,639,090
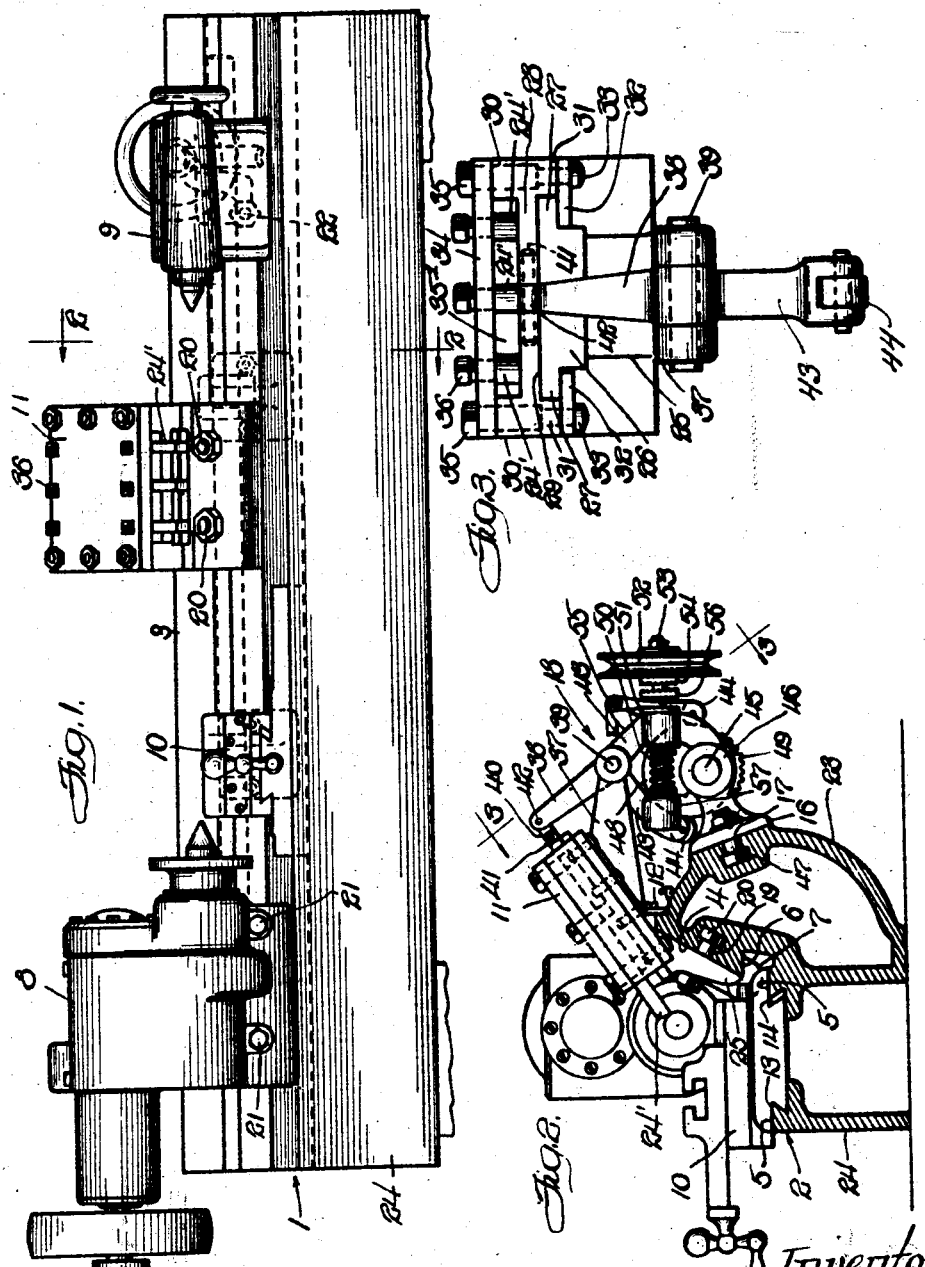
Witness:
Inventor:
John E. Johnson
By Harry Irwin Cromer
Atty.

Patented Aug. 16, 1927.

1,639,090

UNITED STATES PATENT OFFICE.

JOHN E. JOHNSON, OF CHICAGO, ILLINOIS.

LATHE.

Application filed December 18, 1922. Serial No. 607,659.

This invention relates to that class of lathes having a bed and track, or comprising a pair of parallel tracks disposed at an angle with respect to each other and adapted to support a head stock, a tail stock, a slide rest or carriage and an auxiliary tool support or rest in operative position.

The principal object of the invention is to provide a simple, economical and efficient lathe.

A further object of the invention is to provide a lathe having a bed and track, or two-part bed, comprising a pair of parallel tracks or beds disposed at an angle with respect to each other and adapted to support a head stock and tail stock and the usual slide rest or carriage and an auxiliary tool support or rest in operative position and in adjustable relation to each other.

Other and further objects of the invention will appear from the following description and claims, and from an inspection of the accompanying drawings which are made a part hereof.

The invention consists in the features, combinations, arrangements of parts, and details of construction herein described and claimed.

In the accompanying drawings,

Figure 1 is a view in side elevation of a lathe constructed in accordance with my invention, with the lower part of the frame or legs omitted or broken away;

Fig. 2 is a view in transverse vertical section taken on line 2—2, of Fig. 1, looking in the direction indicated by the arrows and showing the two part lathe bed or main and auxiliary beds or tracks in section, and with the head stock and the usual slide rest or carriage mounted thereon, and an auxiliary tool support or rest slidably or adjustably and detachably mounted upon the upper rear auxiliary lathe bed or track; and Fig. 3 is a detail view in rear elevation taken on line 3—3, of Fig. 2, looking in the direction indicated by the arrows, and showing an upper or auxiliary tool support mounted upon the upper rear or auxiliary lathe bed or track, and mechanism for operating or moving and holding the tools upon the auxiliary tool support or head in operative position with respect to the work.

In constructing an improved lathe in accordance with my invention, I provide a lathe bed 1, comprising a forward lower horizontal main lathe bed or track 2, and a rear upper auxiliary lathe bed or track 3 located above the level of and rearward with respect to said main lathe bed or track 2.

The lower forward or main lathe bed or track 2 and the upper rear auxiliary lathe bed or track 3 are arranged in parallel relation to each other. And the upper forward surface 4 of the auxiliary bed or track 3 is inclined and extends upward and rearward at an oblique angle with respect to the horizontal top surface or surfaces 5 of the main or forward lower lathe bed or track 2. The upper rear or auxiliary lathe bed or track 3 has a bottom horizontal marginal guiding face 6, which is above the level of and in a horizontal plane parallel to the upper horizontal face 5 of the forward or lower main lathe bed 2. A space 7 is thus provided between the opposed faces 5 and 6 adapted to permit a head stock 8, a tail stock 9, a slide rest or carriage 10 of any desired ordinary form, and an upper or auxiliary tool support or tool-supporting rest 11 to be slidably supported in operative position, and in adjustable or movable relation to each other.

The upper rear or auxiliary lathe bed or track 3 is also provided with an upper horizontal marginal guiding surface 12, which is in parallel relation to the opposite bottom marginal guiding surface 6, already described. In other words, the top surface or surfaces 5 of the main lower or horizontal lathe bed 2, and the horizontal marginal guiding surfaces 6 and 12 of the upper rear or auxiliary lathe bed or track 3 are in three different horizontal planes, and the upwardly and rearwardly inclined forward guiding face 4 of the upper rear or auxiliary lathe bed or track is at an oblique angle to the plane of said parallel horizontal faces; and the guiding edges 13 and 14 of the lower or main lathe bed 2 and guiding edges or surfaces 15 and 16 of the upper rear or auxiliary lathe bed or track 3 are all in parallel relation to each other and adapted to accurately guide the head stock 8, tail stock 9, lower slide rest or tool-supporting carriage 10, and upper rear or auxiliary tool support or rest 11, in their respective parallel paths of movement from one adjusted position to another, as desired.

The upper rear or auxiliary track or bed 3 is also provided with a rear upwardly and forwardly extending rearwardly facing inclined face 16, having a central longitudinal slot 17 which extends from end to end thereof. The face 16 may be of any desired length and is adapted to support in operative position an auxiliary tool positioning, or operative mechanism or device 18, whenever such a mechanism is to be employed in connection with the auxiliary tool support or rest 11, or a tool or tools to be supported thereby.

In the form of the device shown in the accompanying drawings, the head stock 8 and tail stock 9 are shown slidably mounted upon the upper rear or auxiliary lathe bed or track 3; and the slide rest 10—which may be of any ordinary and well known or desired form of slide rest or tool supporting carriage such as is in common use and well known in the art,—is mounted in the usual manner upon the lower horizontal or main lathe bed or track 2, and is adapted to be operated by means of a feed screw—not shown—or other suitable ordinary and well known operating means.

The upper rear or auxiliary bed or track 3 has a longitudinal slot 19 which extends from end to end thereof and is adapted to receive headed securing bolts 20 anchored in the base or bracket portion 25 of the upper auxiliary tool support or rest 11, for holding the latter in operative position in any adjusted position into which it may be moved lengthwise of the track 3. The slot 19 is also adapted to receive and hold in any desired adjusted position headed securing bolts 21 anchored in the base of the head stock 8 and thereby securely hold the head stock in any operative position into which it is adapted to be adjusted. The slot 19 is also adapted to admit headed securing bolts 22 anchored in the tail stock 9 and hold the tail stock in operative position in any adjusted position into which it is adapted to be moved.

It should be noted that by mounting the head stock 8, tail stock 9, slide rest or carriage 10, and upper rear supplementary tool support or rest 11 in slidable or adjustable engagement with the tracks 2 and 3, respectively, in the manner in which they are shown in the drawings, the slide rest 10 and tail stock 9 may be moved past each other in either direction longitudinally of the bed or lathe to any desired position with respect to each other and to any desired position with respect to the head stock. And the lower slide rest or carriage 10 and upper rear or auxiliary tool support or rest 11, with the tool or tools thereon, may be moved past each other in either direction longitudinally of the bed or tracks upon which they are slidably mounted, and are adapted to be securely held in any desired adjusted position and with the tools in position to engage and operate upon the work.

The upper rear or auxiliary lathe bed or track 3 is supported by a back frame 23 which is made, by preference, in the form of an upwardly and rearwardly projecting rigid metallic frame or series of frame arms 70 integral with the main frame 24 and also integral with the lower or main bed or track 2 and the upper auxiliary track 3. And the rear grooved face or track portion 16 is also, by preference, integral with the back frame 23.

In the form shown in the accompanying drawings the upper or auxiliary tool support 11 comprises in its construction a supporting bracket or bed 25 in which headed screw bolts 20 are mounted, the heads of said bolts being mounted in and in adjustable or slidable engagement with the retaining walls of the longitudinal slot 19 in the auxiliary or upper rear track 3, already described. Upon and in fixed relation to and, by preference, integral with the supporting bracket 25 is a base plate or rest 26, having longitudinal projecting side margins or guiding flanges 27. And a sliding or adjustable tool-supporting plate or head 28 is slidably mounted upon the inclined upper face 29 of the supporting bracket member or base plate 26. This movable tool-supporting plate or head 28 is provided with upper side marginal flanges 30 and lower side marginal flanges 31 formed integral with the central flat main body portion of said plate 28 and projecting upward and downward on opposite sides of the flanged base plate or rest 26. Bottom guiding plates or flanges 32 are secured in fixed relation to and may be integral with the bottom margins of the longitudinal side flanges 31, 31 of the sliding plate 28. Depending securing screws 33, anchored in the flanges 31 and having their depending heads in supporting engagement with the bottom sides of the guiding or retaining flanges 32, serve to detachably hold the latter in operative position. A top retaining plate 34 is rigidly secured to the upper side flanges 30, 30 of the plate 28 by means of headed bolts 35, or other suitable securing means. The top plate 34 thus extends across and, by preference, covers the plate 28, and is spaced apart from the central main body portion of the flanged plate 28 a sufficient distance to provide a space $35^1$ between the inner bottom face of the plate 34 and the top face of the plate 28 adapted to receive and hold in rigid operative position a tool or tools $24^1$ mounted in said space. Set screws 36 are mounted in threaded engagement with the top plate 34 and with their inner ends in securing engagement with the adjacent faces of corresponding tools 24'. The tools 24' are thus rigidly held in operative position between the inner or main sliding plate 28 and the top tool retaining plate 34, said retaining plates forming a sliding tool support or head, which is movable on and in sliding engagement with the flanged base-plate or rest 26.

From the foregoing it will be readily seen that the tool-supporting head or frame—comprising the sliding flanged tool-supporting plate 28 and top tool retaining plate 34 and bottom guiding flanges 32 are rigidly connected—is slidably mounted upon the base plate or rest 26 on the supporting bracket 25 which is rigidly mounted on the track 3 in any desired adjusted position. The bracket or base 25 has a rearwardly projecting bracket arm 37, in which is pivotally supported a tool actuating lever 38, which is provided with a supporting pin or axle 39, the opposite ends of said axle 39 being mounted in forked ends of the rear bracket arm 37 between which said operating lever extends. The upper end of the tool actuating lever 38 is operatively connected with the intermediate flanged tool-supporting plate or head 28, by means of a connecting link 40, one end of which is pivotally connected with the tool-supporting head or plate 28 by means of a pivot pin 41, and the opposite end of which is pivotally connected with the lever 38 by means of a pivot pin 42. The upper or auxiliary tool-support or rest 11, as a whole, is thus adapted to support a tool or tools 24' in position to engage any material or work supported between the head-stock and tail stock, and the tool-supporting head or frame thus formed by the rigidly connected plates 28 and 34 is movable on the base 26 by means of the lever 38.

Suitable means is provided for actuating the tool-operating lever 38, and thereby operating or adjusting the tool or tools 24' and supporting the same in any desired operative position with respect to the work.

In the form of the device shown in the drawings, the operating lever 38 is provided with lower forked arms 43, each of which is provided with an antifriction roller 44 upon its lower end. A shaft 45 is journaled at its opposite ends in suitable supporting brackets 46, which are mounted upon the face 16 of the back frame 23, or back portion of the track 3. The brackets 46 may be adjustably or otherwise secured to said back frame 23 or back portion of the track 3 by means of headed bolts 47 which are anchored in the supporting brackets 46 and have their headed ends in slidable or adjustable engagement with the retaining walls of the slot 17, already described.

An eccentric or cam 48 is fixed to the rotary shaft 45 and has its peripheral or cam surface between and in operative engagement with the antifriction rollers 44, 44 on the forked arms 43 of the lever 38. Suitable means for actuating the rotary shaft 45 is provided, which may consist of a worm wheel 49, fixed to the shaft 45, a worm 50 mounted in suitable bearings 51, 51, and in toothed engagement with the worm wheel 49, and an operating wheel or belt pulley 52 mounted upon and adapted to be operatively connected with and disconnected from the worm shaft 53, by means of a clutch 54, which may be of any ordinary and well known or suitable form.

A clutch operating lever 55 is mounted in operative engagement with the movable clutch member 56, and is adapted to operatively connect the pulley wheel 52 with the worm shaft 53, and to disconnect said pulley wheel and shaft, when desired, by throwing the movable clutch member into and out of clutching engagement with its mating clutch member on the driving wheel 52.

From the foregoing it will be readily understood by those skilled in the art, that the upper or auxiliary tool support or rest 11, with its supporting bracket 25 is adapted to be moved longitudinally of the upper or auxiliary track 3 to any desired adjusted position. And the slidable tool-supporting head formed by the rigidly connected plates, 28, 34, of the rest 11 is adapted to be actuated by the operation of the forked tool-operating lever 38, so as to move and support the tools 24' in operative position and in engagement with the work in whatever position the tool support or auxiliary rest 11 may be adjusted.

It is also obvious from the foregoing description that my improved lathe, comprising a lower forward main lathe bed or track 2 and an upper auxiliary bed or track 3, constructed and arranged as above described, is adapted to enable various forms of auxiliary tool supports or rests, or tool-supporting and actuating means such, for example as the support 11, to be mounted upon and supported in operative position, and adjusted with respect to the rear upper or auxiliary lathe bed or track 3, and in any desired operative position with respect to the work.

I claim:

1. In a lathe, the combination of a lower front lathe bed, an upper track located above the level of and rearward with respect to the lower front lathe bed and having an upwardly and rearwardly inclined guiding surface disposed at an oblique angle with respect to the top face of the lower front lathe bed, a head stock, a tail stock mounted in position to extend over the lower front lathe bed, a tool support movably mounted on said upper track and in sliding engagement with said inclined guiding surface, and means for actuating a tool mounted on said movable tool support, said tool-actuating means comprising a lever pivotally mounted on said tool support and having forked arms the ends of which are spaced apart, a cam rotatively mounted between and in operative engagement with said forked arms and adapted to reciprocate said lever, and means for operating said cam.

2. In a lathe, the combination of a lower front lathe bed, an upper track in parallel relation to and located above the level of and rearwardly with respect to the lower front lathe bed, said upper track having an inclined guiding surface disposed at an oblique angle to the top face of the lower front lathe bed, a head stock, a tail stock mounted on said upper track in sliding engagement with said inclined guiding surface and in movable relation to and extending over the lower front lathe bed, a tool-supporting carriage movable on the lower front lathe bed, an auxiliary tool support mounted on and in slidable engagement with the upper track, said auxiliary tool support comprising a base, a slidable tool supporting head mounted in slidable engagement with said base, means for securing a tool in operative position on said head, and actuating means for operating said slidable tool supporting head, said actuating means comprising a lever pivotally mounted on said base and connected with said head and having forked lever arms the ends of which are spaced apart, a cam rotatively mounted between and in operative engagement with said forked arms, for reciprocating said lever, and means for operating said cam.

3. In a lathe, the combination of a lower front lathe bed, an upper track in parallel relation to and located rearward and above the level of said lower front lathe bed, said upper track having an upwardly and rearwardly inclined guiding surface disposed at an oblique angle to the top face of said lower front lathe bed, a head stock, a tail stock mounted in position to extend over the lower front lathe bed, a tool-supporting rest movable upon the upper track, a tool-supporting member movable upon said movable track-engaging rest, and means for actuating said movable tool-supporting member upon said rest in any position in which the latter may be located on said upper track, said actuating means comprising a pivoted lever operatively connected with said movable tool-supporting member, and having forked arms the ends of which are spaced apart, a cam rotatively mounted between and in operative engagement with said forked arms, for reciprocating said lever, a rotative shaft upon which said cam is mounted, and gear mechanism operatively connected with said shaft and adapted to rotate the same.

4. In a lathe, the combination of a lower front lathe bed, an upper track in parallel relation to and located rearwardly and above the level of said lower lathe bed, said upper track having a front guiding surface extending upward and rearward at an incline above the level of the front lathe bed, a rear guiding surface on said upper track and extending downwardly and rearwardly at an incline back of said upwardly and rearwardly extending inclined guiding surface, a head stock, a tail stock mounted on said upper track and extending over the lower front lathe bed, a tool-supporting rest mounted on said upper track, and tool-actuating means mounted on said rear downwardly and rearwardly extending inclined guiding surface and adapted to actuate a tool mounted on said tool-supporting rest.

Signed at Chicago, in the county of Cook and State of Illinois, this 15th day of December, 1922.

JOHN E. JOHNSON.